Feb. 23, 1943.  M. DE K. T. KENNEDY  2,311,668
ENGINE STAND
Filed Aug. 20, 1941  3 Sheets-Sheet 1
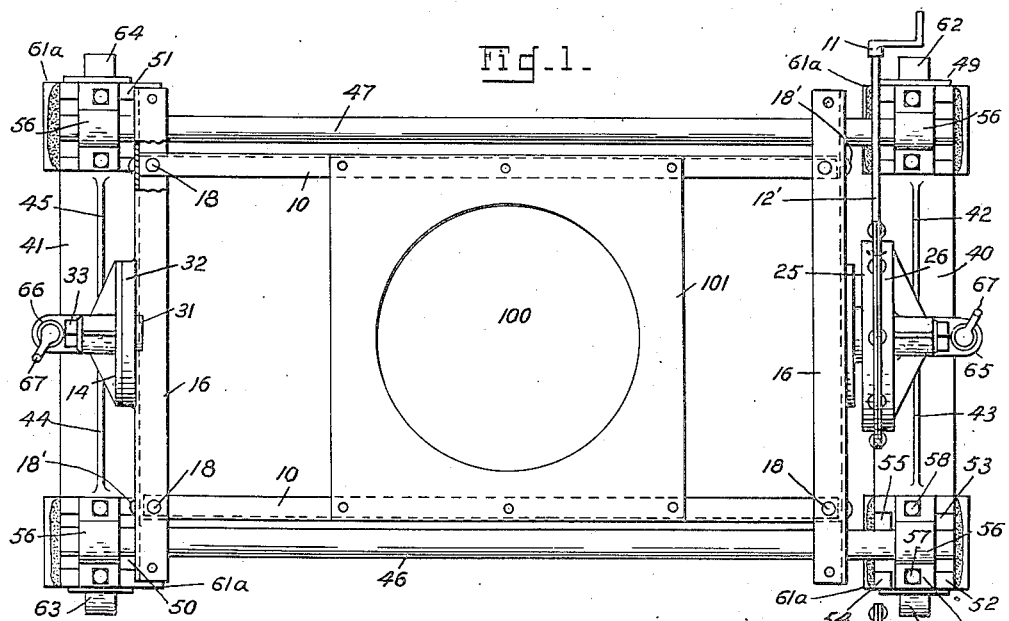
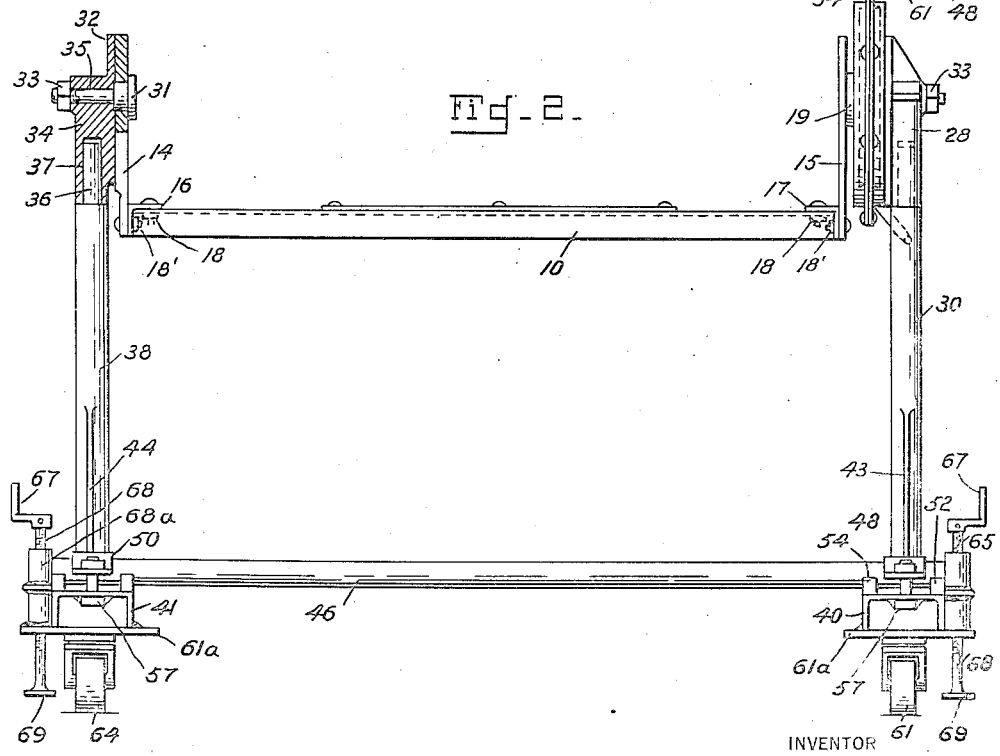
INVENTOR
Maurice de K. T. Kennedy
BY
ATTORNEYS Feb. 23, 1943. M. DE K. T. KENNEDY 2,311,668
ENGINE STAND
Filed Aug. 20, 1941 3 Sheets-Sheet 2
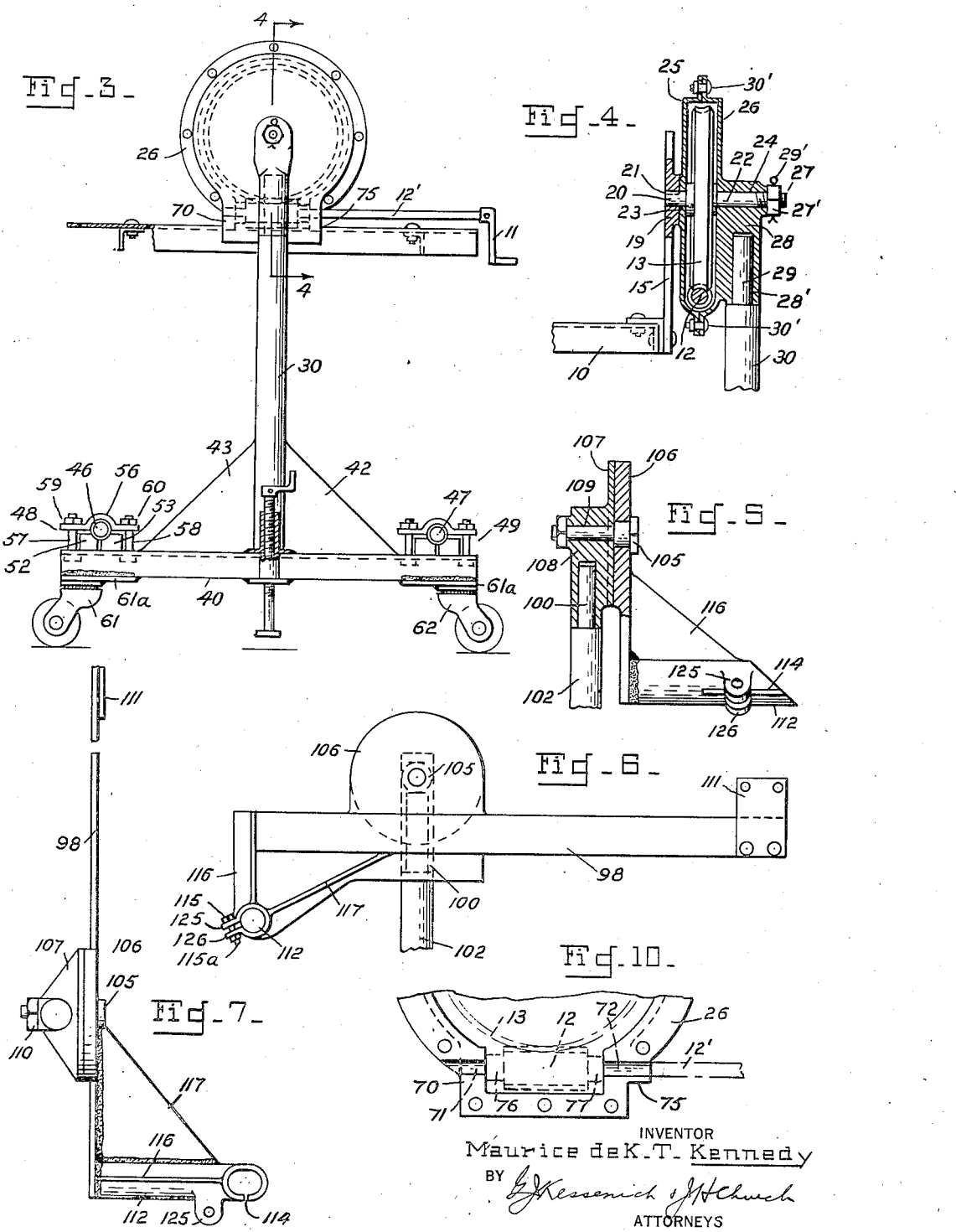
INVENTOR
Maurice de K. T. Kennedy
BY
ATTORNEYS

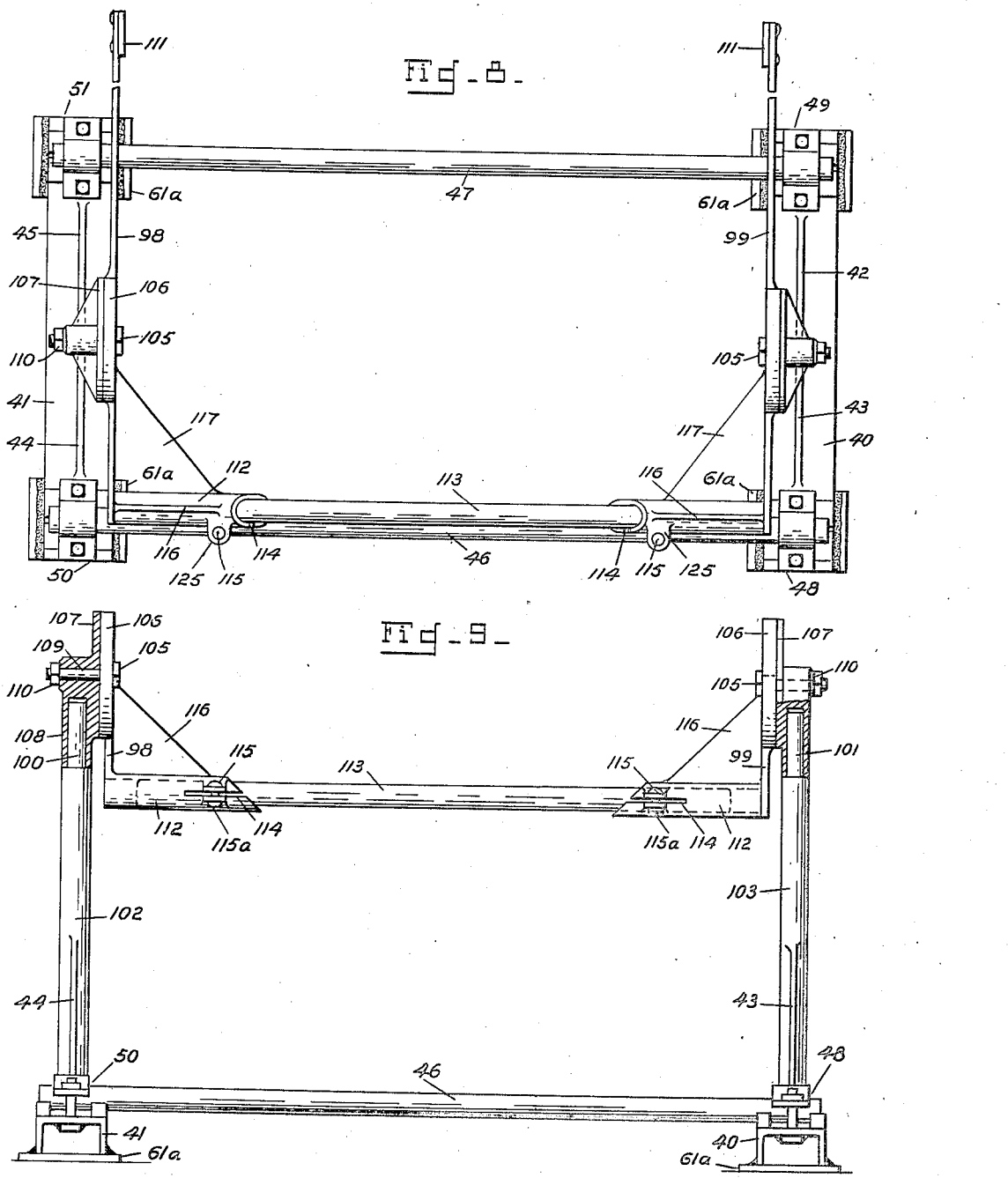

Patented Feb. 23, 1943

2,311,668

UNITED STATES PATENT OFFICE 2,311,668

ENGINE STAND

Maurice de K. T. Kennedy, United States Army, Flint, Mich.

Application August 20, 1941, Serial No. 407,587

1 Claim. (Cl. 29—89)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to an adjustable stand.

An object of my invention is to provide an inspection stand and also an overhaul stand for internal combustion engines that may readily be disassembled thus minimizing transportation difficulties in motorized military troop movements.

Another object of my invention is to provide stands which may be readily adapted to hold many different types of internal engines for routine inspection and also for extensive overhaul.

Another object of my invention is to provide a stand which is readily adjustable in size.

Another object of my invention is to provide an adjustable platform which incorporates inherent self-locking means in the adjusting means so that no external means are necessary to lock the platform in the adjusted position.

The specific nature of the invention as well as other objects and advantages thereof will clearly appear from a description of a preferred embodiment as shown in the accompanying drawings in which:

Fig. 1 is a plan view of the overhaul stand.

Fig. 2 is a side view of the overhaul stand.

Fig. 3 is an end view of the overhaul stand disclosing some of the details of the gear turnover.

Fig. 4 is an enlarged view showing the gear turnover mechanism for the overhaul stand.

Fig. 5 is an end view of one of the two oppositely disposed support arms in the inspection stand.

Fig. 6 is a side view of one of the two oppositely disposed support arms in the inspection stand.

Fig. 7 is a plan view of one of the two oppositely disposed support arms in the inspection stand.

Fig. 8 is a plan view of the inspection stand with the supporting tube in place.

Fig. 9 is a side view of the inspection stand with the supporting tube in place.

Fig. 10 is an enlarged view of the worm gear bearings in the overhaul stand.

Referring to the drawings wherein like numerals designate like parts, the platform 10 is rotatable by the hand crank 11 through the worm 12 and worm gear wheel 13. The platform 10 is rigidly connected to perpendicularly extending flat plates 14, 15 by angle iron pieces 16, 17 and removable bolts 18, 18'. Plate 15 has an enlarged portion 19 through which a shaft 20 (Fig. 4) passes. Shaft 20 is keyed to plate 15 by a key 21. Shafts 20 and 22 are formed integral with the worm gear wheel 13 and are rotatable within bearings 23, 24 which are formed in the gear wheel casing halves 25 and 26 respectively. The free end of shaft 22 has a threaded portion 27 upon which nut 27' is held in a predetermined position by cotter pin 29'. The gear wheel casing halves 25, 26 are fastened together in centered relationship by circumferentially disposed bolts 30' which pass through projections on the gear wheel casing halves 25, 26. The gear wheel casing half 26 has an enlarged portion 28 into which a cylindrical hole 28' extends. The hole 28' is adapted to snugly receive the reduced section 29 of supporting member 30.

The worm 12 has an extension 12' (Fig. 10) to which the crank 11 is fastened. The gear wheel casing half 26 has bearing housings 79, 75 (Figs. 3 and 10) formed integral therewith in which round extensions 71, 72 of worm 12 are free to rotate. The enlarged sections 76, 77 abut the bearing housings 70, 75 and maintain the worm 12 in its centered position.

Plate 14 (Fig. 2) is rotatable about the fixed shaft 31 which is clamped to the fixed plate 32 by nut 33 on the threaded end of shaft 31. Plate 32 is welded to the cylindrical member 34 along the line of contact between those two members. Cylindrical member 34 has a hole 35 through which the fixed shaft 31 passes and also a cylindrical hole 36 adapted to snugly receive the reduced section 37 of supporting member 38.

Supporting members 30 and 38 are maintained perpendicular to the channel iron pieces 40 and 41 respectively by triangular plates 42, 43, 44, 45 which are welded to the supporting members and channel pieces along the lines of contact with those elements.

Tubes 46, 47 brace the bottom portion of the stand and hold the supporting members 30, 38 in adjustable spaced relationship. Tubes 46, 47 are held in clamps 48, 49, 50, 51 which are all similar in structure and for that reason clamp 48 only will be described in detail. Clamp 48 (Figs. 1, 2 and 3) comprises: four lugs 52, 53, 54, 55 which are welded to the channel piece 40 and have concave surfaces adapted to partially encircle the tube 46, the upper U-shaped member 56 which is adapted to partially encircle the tube 46 and be disposed between lugs in the axial direction of the tube 46, bolts 57, 58 which are welded to the channel piece 40 and pass through holes in the upper U-shaped member 56, and nuts 59, 60 which fasten the U-shaped member 56.

Casters 61, 62, 63, 64 having upper plates 61a which are welded to the channel pieces 40, 41 allow the stand to be shoved with ease. Floor clamps 65, 66 are welded to the channel pieces 40, 41 approximately midway between the ends of the channel pieces. The floor clamps 65, 66 may be of the type commonly used as door stops wherein the operator causes the clamp to engage the floor in a locked condition by a downward movement of his foot or it may be of the type disclosed in Fig. 2 wherein rotational movement of the crank 67 causes a downward movement of the threaded bolt 68 in the threaded portion 68a and causes the surface 69 to frictionally engage the floor.

The platform 10 may be replaced by a longer or a shorter platform which may be applicable to motors of larger or smaller size by performing the following steps:

1. Remove bolts 18' (Fig. 2) which hold the platform 10 to the members 14 and 15 thus allowing the platform 10 to be removed.

2. Loosen clamping nuts corresponding to 59, 60 (Fig. 3) so that the stand may be adjusted for length to accommodate a larger or smaller platform.

3. Insert the desired platform and fasten that platform by bolts corresponding to bolts 18' (Fig. 2).

4. Tighten the nuts which correspond to nuts 59, 60 (Fig. 3).

It is obvious that the platform 10 may take a variety of forms and shapes depending upon the type of engine to be held so long as suitable connections are available for connecting it to the members 14 and 15 (Fig. 2).

The stand is readily made transportable for service by motorized troops by removing the platform 10 by removing bolts 18', raising and removing the members 28, 34 (Fig. 2) and unclamping clamps 48, 49, 50, 51 and removing tubes 46, 47 (Fig. 1).

The particular gear turnover arrangement described is self-locking, i. e., the handle 11 is turned until the platform 10 assumes the desired angular position and no extraneous means is necessary to maintain the table in that position.

The opening designated as 100 in Fig. 1 may take a variety of forms and shapes to accommodate motors of various sizes. Suitable clamps (not shown) may be mounted on the table 101 for the purpose of clamping the motor.

The inspection stand is the same as the overhaul stand but these are some of the exceptions: In the inspection stand no casters are present, there is no gear turnover, no floor stops are present, and arms are used to support the engine instead of a platform.

Referring to the drawings (Figs. 5-9) the base of the inspection stand is constructed exactly as the base of the overhaul stand except that the stand is not mounted on casters and hence no floor stops would be necessary. Two similar oppositely disposed arms 98, 99 are slipped over the reduced sections 100, 101 of the supporting members 102, 103. Since the arms 98, 99 are similar in construction, the constructional details of arm 98 (Figs. 6 and 9) only are described in detail. A rotatable connection between arm 98 and support 102 is provided in a manner similar to that shown for the member 14 in Fig. 2. Shaft 105 extends through the rotatable plate 106 and is clamped to the stationary plate 107 which is welded to the tubular portion 108. A hole 109 in member 108 allows passage of shaft 105 which is drawn tight against fixed plate 107 by the threaded connection between nut 110 and shaft 105. In the clamped position shaft 105 has no locking effect on plate 106.

The arm 98 is constructed with mounting means which conform to the size and shape of engine to be held. For instance, the plate 111 on one end of the arm 98 is adapted to fit engine mounting beam whereas the other end of the arm 98 has a split tube 112 through which a rod 113 passes so as to provide a support for the engine. The tube 112 is split at 114 so that it may be drawn up tightly around the inserted rod 113 by the cooperation of nut 115a with threaded bolt 115 which passes through holes in spaced ears 125, 126 on tube 112. Triangular shaped ribs 116, 117 are welded to the arm 98 and tube 112 so as to maintain the tube 112 in position.

The inspection stand is readily adjusted for length by loosening the floor clamps 48, 49 and by loosening the bolt 115; the upright members 102, 103 are then moved with respect to one another.

In order to disassemble the inspection stand for traveling it would be necessary to loosen the clamps corresponding to clamps 48 and 115, 115a and then (1) remove the cylindrical members 46, 47 and 113 and then (2) remove the arms 98, 99 individually from association with the reduced portions 100, 101 on the supporting members 102, 103 respectively.

I claim:

An adjustable support of the character described, comprising two spaced side members, end bars securing the side members in parallel spaced relation and adjustable longitudinally on the side members, two oppositely disposed standards rigidly secured to the end bars substantially midway of the length thereof, a member telescopically mounted on each standard, a member rockably mounted on each first mentioned member, an arm rigidly attached to each rockable member and extending laterally therefrom, each laterally extending arm being provided with a split portion, a rod extending from one arm to the other arm and having each end embraced in a split portion of each arm, means on said split portion for adjustably gripping the rod, two other arms rigidly connected with the rockable members and extending in opposite direction from the first mentioned arms and provided with mounting means for attachment to a supporting member.

MAURICE DE K. T. KENNEDY.